United States Patent
Perritt, Jr.

(10) Patent No.: US 12,102,060 B1
(45) Date of Patent: Oct. 1, 2024

(54) AUTONOMOUS VEHICLE AND METHOD FOR DETECTING STRAYS AND MANAGING HERDS

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 18/608,136

(22) Filed: Mar. 18, 2024

(51) Int. Cl.
*A01K 29/00* (2006.01)
*G01D 21/02* (2006.01)

(52) U.S. Cl.
CPC .......... *A01K 29/005* (2013.01); *G01D 21/02* (2013.01)

(58) Field of Classification Search
CPC ............................ A01K 29/005; G01D 21/02
See application file for complete search history.

(56) References Cited

U.S. PATENT DOCUMENTS

| | | | |
|---|---|---|---|
| 6,439,162 B1 | 8/2002 | Van den Berg | |
| 10,663,979 B2 | 5/2020 | Grundey | |
| 2015/0057916 A1* | 2/2015 | Ishii | G01C 21/3697 701/123 |
| 2016/0295833 A1* | 10/2016 | Baize | A01K 15/029 |
| 2018/0049407 A1* | 2/2018 | Castelli | B64C 39/024 |
| 2018/0160943 A1* | 6/2018 | Fyfe | A61B 5/1112 |
| 2019/0025858 A1* | 1/2019 | Bar-Nahum | G06T 7/73 |
| 2019/0278897 A1* | 9/2019 | Zhang | G06F 21/604 |
| 2020/0031465 A1* | 1/2020 | Chung | B64C 39/02 |
| 2020/0135036 A1* | 4/2020 | Campbell | G08G 5/0091 |
| 2020/0154694 A1* | 5/2020 | Santana | A01K 15/023 |
| 2020/0218288 A1* | 7/2020 | Johnson | G05D 1/0866 |
| 2020/0375148 A1* | 12/2020 | Magazzù | A61B 5/0002 |
| 2020/0387727 A1* | 12/2020 | Mishra | G06V 20/13 |
| 2022/0121836 A1* | 4/2022 | Dins | G05D 1/0676 |
| 2023/0263135 A1 | 8/2023 | Azran | |
| 2023/0301272 A1 | 9/2023 | Olsson | |

FOREIGN PATENT DOCUMENTS

| | | |
|---|---|---|
| CN | 107608374 A | 8/2017 |
| CN | 109917802 B | 12/2017 |
| CN | 109933083 B | 12/2017 |
| CN | 216210663 U | 8/2021 |
| CN | 117311381 A | 9/2023 |

OTHER PUBLICATIONS

Henry H. Perritt, Jr., The 21st century cowboy: Robots on the range, 43 Univ. Ark. Little Rock L. Rev. 149 (2020).

* cited by examiner

*Primary Examiner* — Hussein Elchanti
(74) *Attorney, Agent, or Firm* — Henry H. Perritt, Jr.

(57) ABSTRACT

An autonomous herding system designed to manage and retrieve stray animals using an autonomous herding vehicle, each equipped with advanced navigation, propulsion, and sensory technology. The system utilizes a combination of optical-LiDAR sensors, global navigation satellite systems, machine-learning-derived image templates to detect and locate stray animals with respect to a herd and to guide them back. The system's modules collaborate to create an efficient, automated process that identifies stray animals, calculates the necessary approach vectors, and uses strategic movements and noises to encourage strays to rejoin their herd. This streamlines the herding process, reducing labor costs and improving the safety of both animals and human operators.

12 Claims, 6 Drawing Sheets

AUTONOMOUS VEHICLE AND METHOD FOR DETECTING STRAYS AND MANAGING HERDS

CROSS-REFERENCE TO RELATED APPLICATIONS

Not applicable

STATEMENT REGARDING FEDERALLY SPONSORED RESEARCH OR DEVELOPMENT

Not applicable

NAMES OF THE PARTIES OF A JOINT RESEARCH AGREEMENT

Not applicable

INCORPORATION BY REFERENCE STATEMENT

Not applicable

STATEMENT REGARDING PRIOR DISCLOSURES BY THE INVENTOR

The inventor authored the following article: Henry H. Perritt, Jr., The 21st century cowboy: Robots on the range, 43 Univ. Ark. Little Rock L. Rev. 149 (2020)

FIELD OF THE INVENTION

The present invention pertains to the field of animal husbandry, specifically to the use of automated systems and vehicles for managing and herding animals. "Animal" refers to a species in the Clade Euungulate, particularly those in the Artiodactyla order, commonly known as "herd" animals," such as cattle, sheep, and pigs. The invention involves application of technology-based solutions to enhance the efficiency, safety, and effectiveness of herding stray animals back into their designated herds. "Stray" refers to an animal that has separated from a herd. This invention integrates advancements in autonomous vehicle technology, artificial intelligence, GPS and sensor-based localization, and behavioral science to automate the process of detecting, approaching, and guiding stray animals back to their herds without the need for direct human intervention.

Within the broader context of agricultural technology and smart farming, the invention addresses a specific yet critical aspect of livestock management. It offers a novel approach to solving the age-old problem of managing strays, which is a common challenge in the farming of cattle, sheep, goats, and other herd animals. By automating the herding process, this invention not only aims to reduce labor costs and dependency on human or canine herders but also seeks to minimize the stress and potential harm to animals during the retrieval process.

The field of this invention is at the intersection of several areas of technology and agriculture: robotics and autonomous vehicles, artificial intelligence and machine learning, animal behavior and welfare, and GPS and sensor technology. It represents a significant step forward in the application of technological innovations to traditional farming practices, contributing to the evolution of smart farming techniques that can lead to more sustainable, efficient, and humane agricultural practices.

BACKGROUND OF THE INVENTION

The art of animal husbandry, an age-old practice integral to agricultural societies worldwide, has continually evolved, embracing innovations that enhance efficiency and effectiveness in managing livestock. One of the perennial challenges in this field is the management of herds, specifically ensuring that all animals remain within the safety of the herd. The separation of animals from their group not only poses risks to the stray but can also lead to significant losses for farmers and herders due to predation, accidents, or health issues arising from isolation.

Cattle and other ruminants tend to move in the opposite direction when an intruder such as a handler, another type of animal or a machine moves into their flight zone. Which way they move depends on where the intruder is with respect to the animal's point of balance. The point of balance is usually at the animal's shoulder, and it is determined by the animal's wide angle vision. All species of livestock will move forward if the intruder is positioned behind the point of balance. They will back up if the intruder is positioned in front of the point of balance. Animals exhibit similar behavior when the flight-zone intruder is not a human being but a dog or a vehicle.

Historically, the task of herding animals and retrieving those that stray has been the responsibility of cowboys, shepherds, and herding dogs, whose training and instincts have been invaluable. Cowboys often move about on horseback to attain speeds necessary to move among herd and strays. These methods, while effective, are labor-intensive and require constant vigilance. Furthermore, the reliance on human or canine herders limits the scalability of these operations and can be impractical in vast, rugged, or inaccessible terrains.

The advent of mechanization in agriculture introduced the use of vehicles for various tasks, enabling innovations in herd management as well. Early attempts to mechanize herding included the simple use of vehicles to transport human herders more efficiently across their lands, allowing them to monitor and manage their herds more effectively. These methods, however, still heavily relied on human labor and did not fundamentally change the approach to managing strays.

The wide availability of inexpensive consumer drones with sophisticated control and navigation systems, formally known as unmanned aircraft systems, has fueled inventive energy to develop specific drone applications, often by after-market entrepreneurs and innovators.

The development of autonomous vehicles and advancements in robotics and artificial intelligence have paved the way for a more sophisticated approach to herding. By equipping vehicles with sensors and AI algorithms, it has become possible to identify, track, and manage individual animals within a herd autonomously. This technological leap has the potential to revolutionize herd management by automating the detection and retrieval of stray animals, reducing labor costs, and improving the safety and well-being of the animals.

Global positioning satellite technology has evolved to the point that many vendors offer cheap global positioning satellite (GPS) receivers, some of them integrated with inertial measuring units (IMU), capable of sending data to vehicle control systems.

Image acquisition benefits from commercially available and relatively inexpensive camera-Lidar fusion devices, which integrate images obtained by optical cameras and Laser ranging units to improve resolution of digital images.

Image matching enabled by machine learning techniques have been applied to large learning databases of human faces and animal images, resulting in the development of commercially available repositories, which constitute enrolled data bases against which live images can be matched. Several vendors make available repositories of animal images that include images of herd animals such as cattle and sheep.

The system and method described in the patent claims represent a culmination of these advancements in disparate fields, which heretofore have not been connected, offering a comprehensive solution to the challenge of herding stray animals back into their groups. By obtaining and utilizing herding vehicles equipped with the capability to locate both the herd and the stray, identify the necessary path and movements, and generate noises and movements to motivate the stray animal's return, this method leverages pieces of modern technology to address an ancient problem in animal husbandry.

This innovation stands on the shoulders of centuries of agricultural practice and decades of technological advancement. It not only signifies a leap forward in the efficiency and effectiveness of herd management but also illustrates the potential for technology to enhance and transform traditional practices in agriculture and beyond.

BRIEF SUMMARY OF THE INVENTION

The invention in an automated system and related method for herding stray animals back into their herd. This system comprises an autonomous herding vehicle equipped with various modules for detecting and guiding stray animals. The herding vehicles can be either ground vehicles of the ATV type or aerial, such as unmanned rotorcraft (drones). Each vehicle has:

A sensor module with optical-LiDAR fusion sensors, radio receivers to interact with a global navigation system, and inertial measurement units.

An animal detection module that processes sensor signals to create images, then compares those images to animal templates in a repository derived from machine learning to identify members of the herd.

A location module for calculating positions of the vehicle, the herd, and the stray animal.

A herding module to determine the vectors representing the paths for the stray follow to rejoin the herd and to position the herding vehicle accordingly.

A navigation module that computes the course the vehicle must take to approach the stray and guide it back.

A propulsion module that causes the vehicle move at an appropriate speed along the desired direction.

A suspension module, which supports the ground version of the vehicle and lifts the aerial version of the vehicle.

An alerting module that uses visual (a pivoting flag) and audio signals (including a loud horn, distressed animal sounds, and cowboy shouts) to influence the stray's movements.

The method specifies the steps necessary for utilizing the herding vehicles to identify and herd the stray animals using both visual and audio cues to motivate them to return to the herd.

The described system integrates technology and animal behavior knowledge to manage a herd and prevent the loss of animals autonomously. It is a sophisticated approach to livestock management that reduces the need for human intervention in the herding process,

BRIEF DESCRIPTION OF THE SEVERAL VIEWS OF THE DRAWINGS

To facilitate the discussion of any particular element or act, the most significant digit or digits in a reference number refer to the figure number in which that element is first introduced.

DETAILED DESCRIPTION OF THE INVENTION

Figure 1:
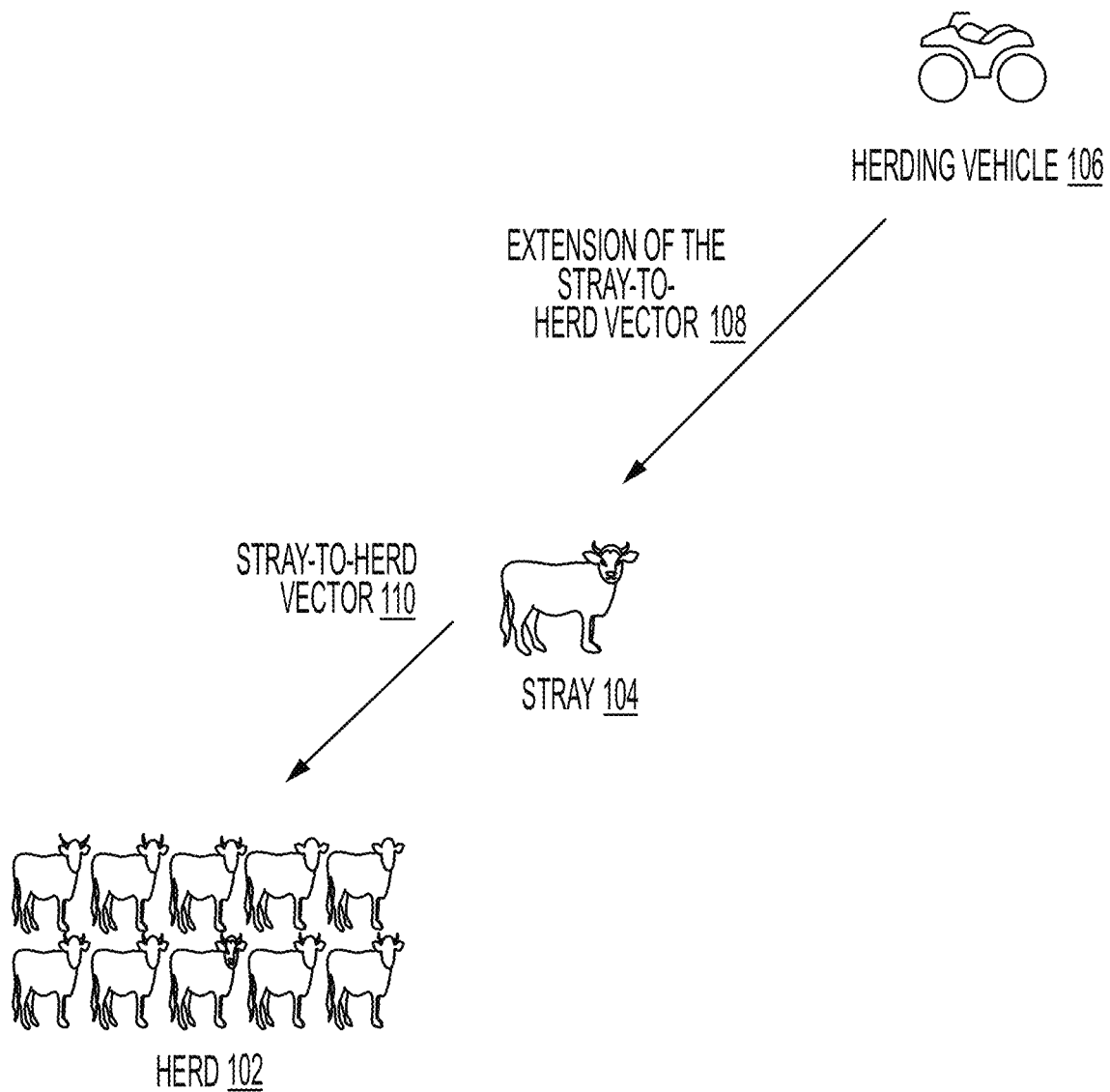
FIG. 1 provides a macroscopic view of the system, showing a Herd 102, a Stray 104, a Herding vehicle 106, a vector from the stray to the herd 110 (the second vector), and an extension of that vector 108 (the third vector).
Figure 2:
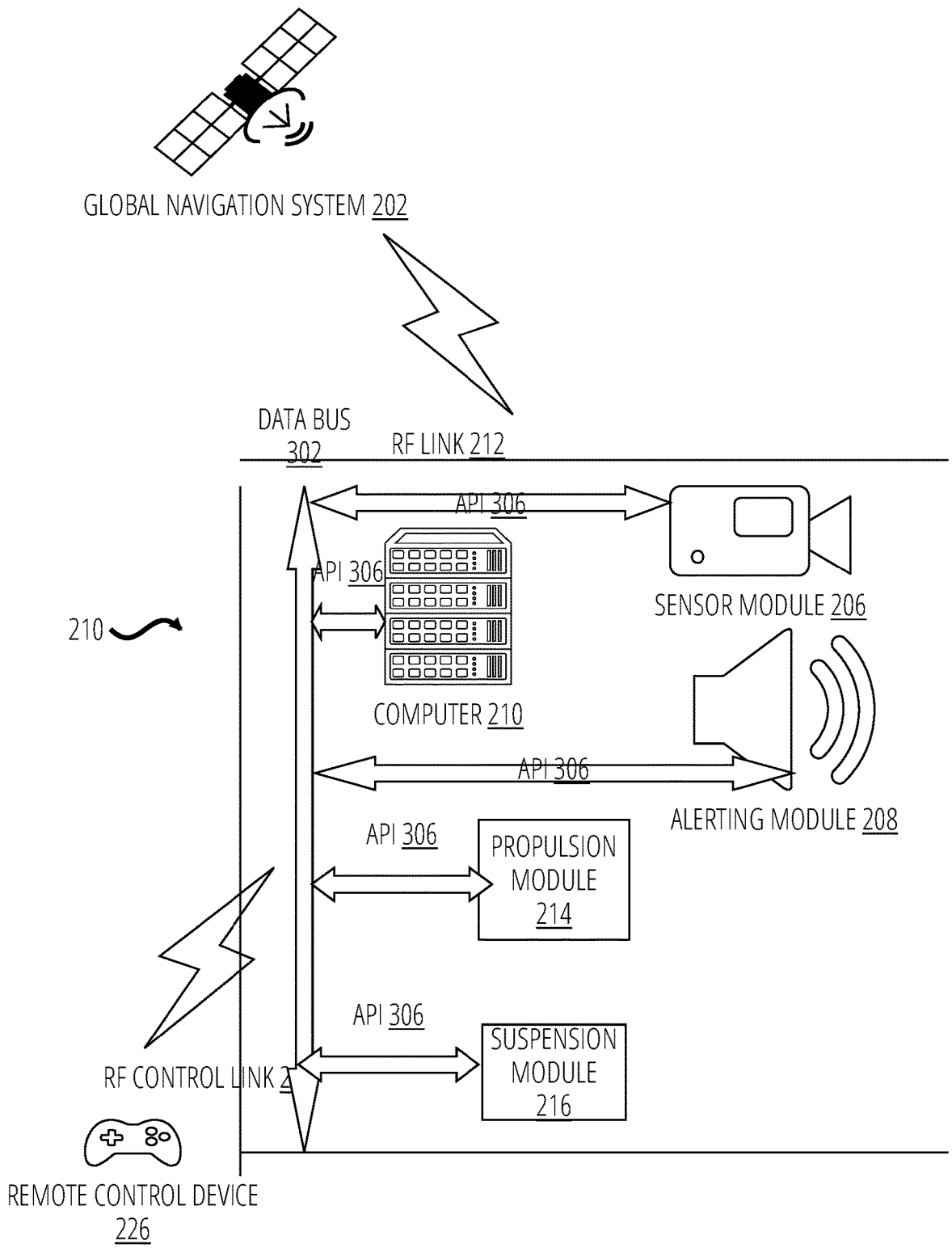
FIG. 2 shows the main components of the system, comprising a Global navigation system 202, an RF Control link 204, a Sensor module 206, an Alerting module 208, a Computer 210, an RF link 212, a Propulsion module 214, a Suspension module 216, and a Remote control device 226. "Global navigation system" refers to a system comprising multiple satellites in earth orbit that send radio signals to the surface of the Earth, designed to permit systems receiving those signals to determine their latitude, longitude, and altitude. "RF" refers to "radio frequency" signals. "Radio" refers to a device for transmitting and/or receiving electromagnetic wages in the radio spectrum and interpreting them for human understanding.
Figure 3:
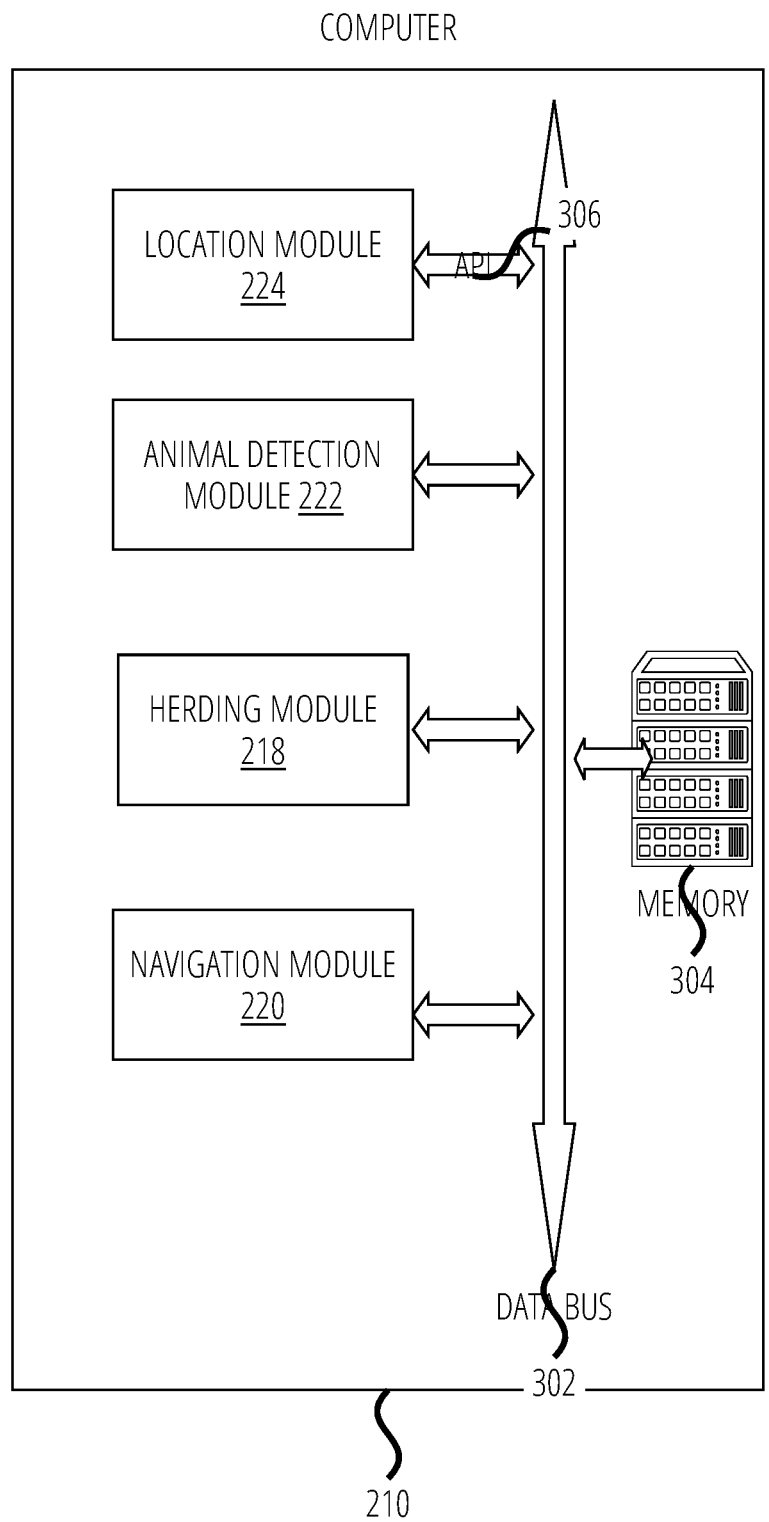
FIG. 3 provides more detail on the computerized data-processing aspects of the system, comprising a Computer 210, an Animal detection module 222, a Location module 224, a Herding module 218, a Navigation module 220, a Data bus 302, a Memory 304, and an a plurality of APIs 306. "Data bus" refers to a connection among multiple digital subsystem that allows the subsystems to exchange data by sending electric signals of prescribed levels and formats to the data bus. "API" refers to an application program interface, a data structure that permits one digital subsystem to communicate with another by exchanging data. "Program" refers to a plurality of coded instructions that cause a digital computer to carry out discrete operations.
Figure 4:
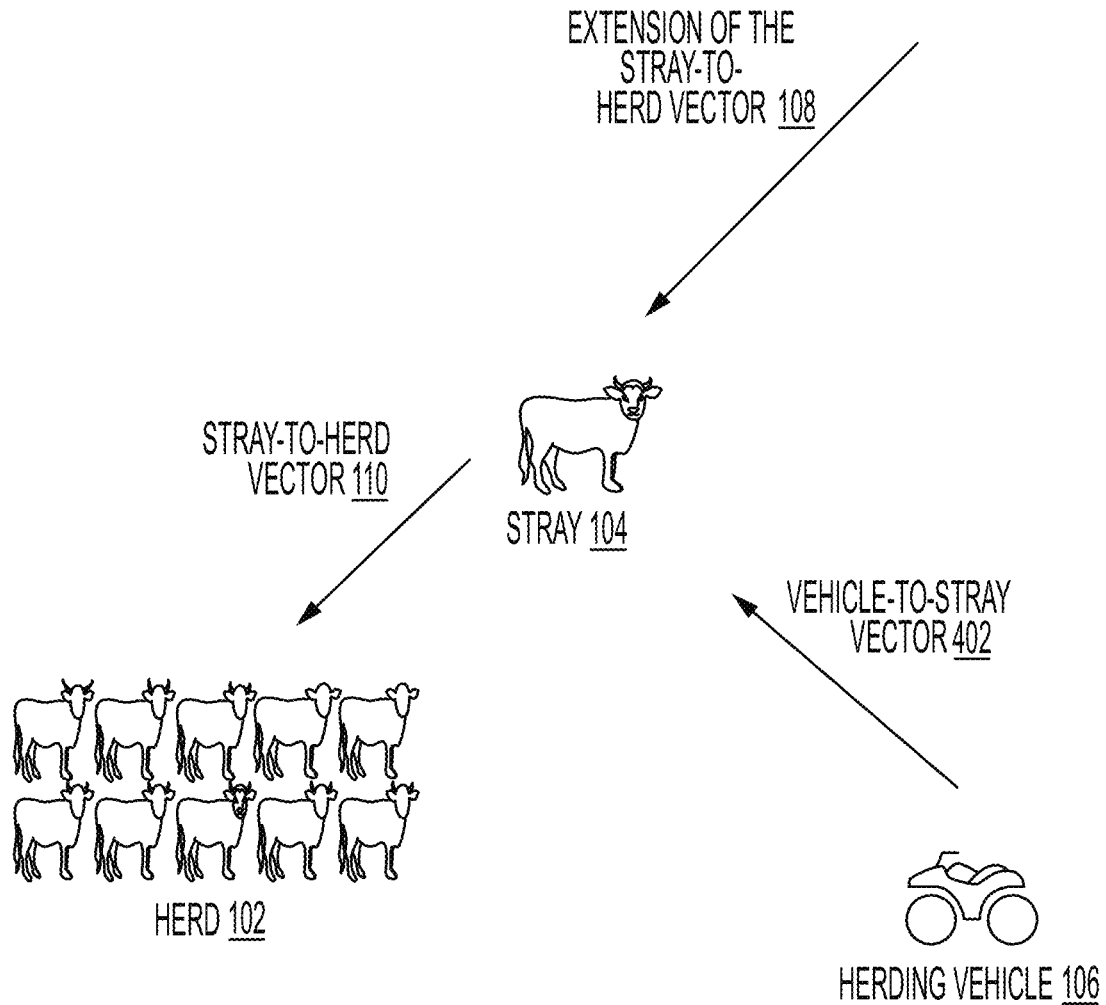
FIG. 4 illustrates the vectors defining the paths to be followed by the Herding vehicle 106 and the Stray 104 when the vehicle begins its movement to close on the stray (the first vector) and then moves to cause it to return to the Herd 102.

The Herding vehicle 106 is a commercially available ground vehicle, of the ATV type in the main embodiment, comprising a plurality of modules, which collectively enable the vehicle autonomously to detect animals 104 that have strayed from a Herd 102, to approach those Strays 104 and to position the vehicle 106 to take advantage of the stray's 104 instinctive flight response to drive it back into the Herd 102. Each module has an application program interface (API) 332 that contains data structures for inputs and outputs specific to that module. The modules include a Sensor module 206, an Animal detection module 222, a Location module 224, a Herding module 218, a Navigation module 220, a Propulsion module 214, a Suspension module 216, and an Alerting module 208. The modules communicate with each other through these APIs, which are mutually connected through the data bus.

"Autonomous" refers to the capability to perform a defined mission without receiving detailed commands from a human operator. It does not exclude human commands to begin and to terminate a mission.

The Sensor module 206 makes use of off-the-shelf camera-lidar fusion devices, such as the ones offered by Kyocera and Beamagine. "Camera-lidar fusion devices" refer to commercially available units that combine digital images captured by cameras and Lidar sensors integrated with circuitry that provides digital output in the form of digital images with enhanced resolution and range information with respect to the object in the image. The Sensor module 206 also makes use of off-the-shelf GPS-IMU hardware combining global navigation system radio receivers and inertial measuring units, such as the ones manufactured by Navtech and Life Performance Research. The Sensor module 206 contains a control signal radio receiver for the purpose of receiving commands from a Remote control device 112 to begin or to end a mission.

The Sensor module 206 sends images of what its camera and lidar "see" and data on the Herding vehicle's 106 latitude and longitude to the Animal detection module 222 and to other modules through its API 306 and the Data bus 302. Sensor data is updated at periodic intervals, every one second in the preferred embodiment, "Range" refers to the distance between a sensor and a target. "Azimuth" refers to the angle between an arbitrary reference, such as magnetic, north and a line drawn to a target.

The Animal detection module 222 is a computer program executed on the onboard Computer 210, which identifies an animal that has strayed from the herd by matching the image acquired by the Sensor module 206 to a template of an individual animals and herds. The Animal detection module 222 module makes use of machine learning to recognize Herds 102 and Strays 104. It compares camera-lidar-device captured images with images in internally stored repositories of particular species. Each repository comprises an enrolled database-α collection of templates against which live images captured by the camera lidar device are matched. An enrolled database is a database, distinguished from a learning database, used in machine learning animal recognition systems. An enrolled database uses algorithms developed from the learning database to define templates against which live images can be matched. The Animal detection module 222 computes range and azimuth of the Herd 102 and the Stray 104 with respect to the Herding vehicle 106 and sends that range and azimuth information to the Location module 224.

The Location module 224 is a computer program executed on the onboard Computer 210, which locates the stray and the herd by taking the latitude and longitude of the herding vehicle and using vector arithmetic to combine the range and azimuth information received from the Animal detection module 222 to compute the latitude and longitude of the Herd 102 and the Stray 104.

The Herding module 218 is a computer program executed on the onboard Computer 210, which calculates the Stray-to-herd vector 110 (the second vector), the Extension of the stray-to-herd vector 108 (the third vector), and the latitude and longitude of points on the circle defining the Flight Zone 502, calculates the latitude and longitude of the points defining the Point of balance 504 and outputs those to the Data bus 302 through its API 306. "Vector" refers to a virtual object in mathematics and physics that has direction as well as magnitude. Vectors typically are represented by values for each of two or three axes, corresponding to orthogonal directions, such as latitude, longitude, and altitude.

The Navigation module 220 is a computer program executed on the onboard Computer 210, which takes the data computed by the Herding module 218 and uses them to compute the Vehicle-to-stray vector 402 (the first vector) and the Extension of the stray-to-herd vector 108 necessary to cause the Herding vehicle 106 to close on the Stray 104 and then position itself on the Extension of stray-to-herd vector 108 within the stray's Flight Zone 502 such that the Stray 104 is caused to move back into the Herd 102.

Following these commands, the Herding vehicle 106 proceeds toward the Stray 104 on the Vehicle-to-stray vector 402 until it gets to the edge of the Flight Zone 502. Once the vehicle 106 reaches the edge of the Stray's 104 Flight Zone 502, it follows the circumference of the Flight Zone 502 to intercept the Extension of the stray-to-vector 108, positions itself on to that vector, and then turns to follow the Extension of the stray-to-herd vector 108 to approaches the Stray 104. Once the vehicle enters the Stray's 104 Flight Zone 502, at proceeds at a reduced speed above (toward the head) or below (toward the tail) the Point of balance 504 as appropriate to cause the Stray 104 to return to the Herd 102 along the Stray-to-herd vector 108, adjusting the vehicle's speed so it does not make contact with the Stray 104. Once the Herding vehicle 106 enters the Flight Zone 502, it sends a signal to the Alerting module 208, causing it to generate noises and movement through its to reinforce the stray's motivation to return to the Herd 102, stimulated initially by the proximity of the Herding vehicle 106.

Figure 5:
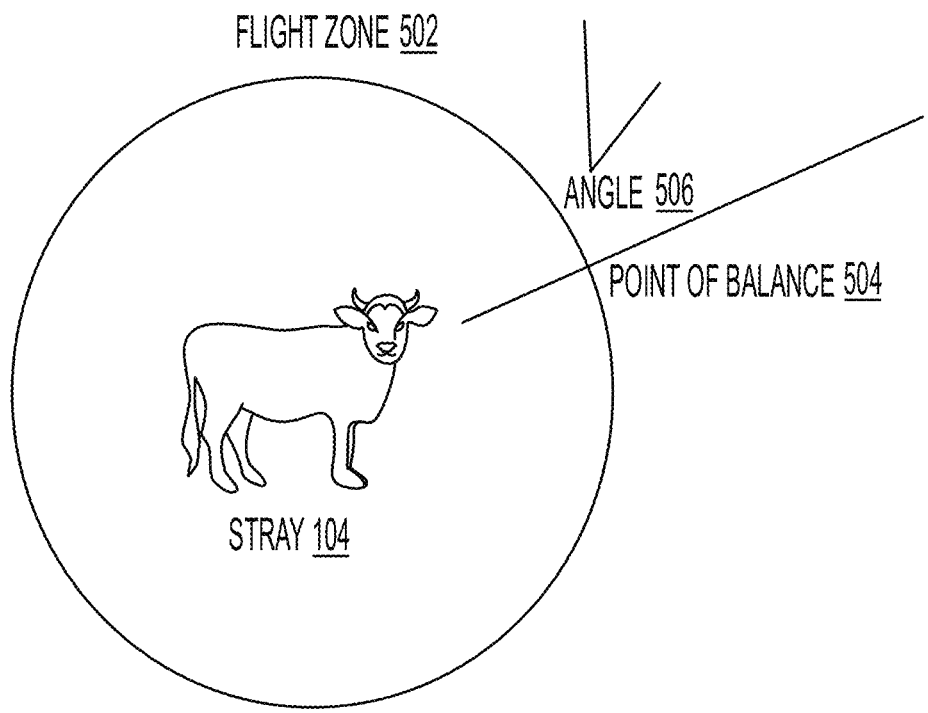
FIG. 5 depicts the stray with the Flight Zone 502 around it and the angle 506 representing the Point of balance 504.
Figure 6:
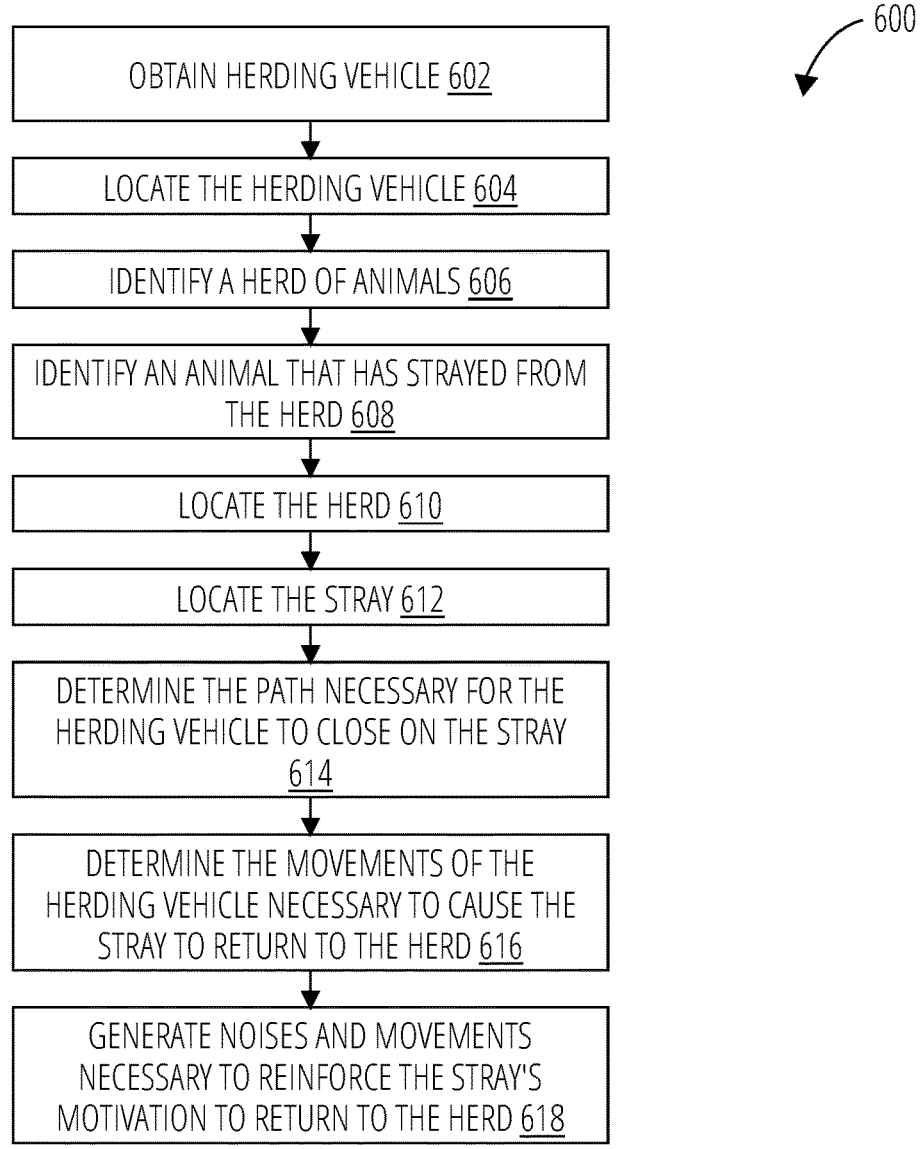
FIG. 6 illustrates a method 400 for herding stray animals back into a herd, in accordance with the main embodiment. In block 602, routine 600 obtains a herding vehicle. In block 604, routine 600 locates the herding vehicle. In block 606, routine 600 identifies a herd of animals. In block 608, routine 600 identifies an animal that has strayed from the herd. In block 610, routine 600 locates the herd. In block 612, routine 600 locates the stray. In block 614, routine 600 determines the path necessary for the herding vehicle to close on the stray. In block 616, routine 600 determines the movements of the hearing vehicle necessary to cause the stray to return to the herd. In block 618, routine 600 generates noises and movements necessary to reinforce the stray's motivation to return to the herd.

Empirical research into the behavior of herd animals shows that a Flight Zone 502 exists. "Flight zone" refers to the area around an animal, typically represented by a circle of a particular diameter, that, when entered by a human being, a different type of animal, or a large object such as a vehicle, causes the animal to move away. When an intruder such as an animal a human, or a machine enters the flight zone, the herd animal instinctively moves away from the intruder. "Intruder" refers to a human, an animal, or an object such as a vehicle that has moved into an animal's flight zone. Human cowboys have learned where the flight zone exists around cattle and makes use of it to herd cattle. The Flight Zone 502 for cattle varies from 25 feet in diameter for tame animals to 300 feet in diameter for less tame ones. The foundation of the Herding module 218 is a behavioral model of an animal—in the preferred embodiment a cow, bull, or steer. The model depicted in FIG. 5, reflects empirical data on how an animal of that type responds to visual, oral, and tactile stimuli. Typically, an accurate but simple model has the animal moving away from any large object placed within a distance of 10 feet more or less (the Flight Zone 502) and within an arc defined by a line extended from the animal's head and neck and a line extending from it shoulder at an Angle 506 of about 60° F.rom a centerline drawn through the nose (the Point of balance 504). The speed with which the animal moves away from the object is inversely proportional to the distance between the object and the animal. Thus, a herding vehicle can cause an animal to move in a particular direction at a desired speed by positioning itself correctly within the flight zone, forward or back of the point of balance.

The Navigation module 220 transforms vector information received from the Herding module 218 into commands for the Propulsion module 214, sent via its API 306 and the Data bus 302, according to a closed-loop automatic control system. An automatic control system, implements a decision process, also called the control law, that dictates the appropriate control actions to be taken for the speed and direction of the herding vehicle to be maintained within acceptable tolerances. These decisions are taken based on how different the actual speed and direction are from the desired, called the error, and on the knowledge of the vehicle's response to changes in the propulsion and suspension modules. Error signals are fed back to the automatic control system, which produces the requisite commands to the propulsion and suspension modules to reduce or eliminate the error.

The foundation of the Navigation module 220 is vector arithmetic, which takes latitude and longitude data and vectors as its inputs, and from those data computes a Vehicle-to-stray vector 402 and, as the Herding vehicle 106 moves, determines an error function representing the deviation between the herding vehicle's position and the Vehicle-to-stray vector 402, and then the circumference of the Flight Zone 502, and finally on the Extension of the stray-to-herd vector 108 on which the Herding vehicle 106 positions itself to cause the Stray 104 to move back toward the Herd 102.

Algorithms and data necessary for computation are stored in and retrieved from a Memory 304, which is a component of the Computer 210. The Memory 304 combines random-access and non-volatile semiconductor chips capable of storing the data generated and manipulated by the various modules and capable of retaining parameters for types of animal to be herded and types of herding vehicle.

The Propulsion module 214 is an off-the-shelf subsystem for an ATV or farm vehicle programmed to accept course and speed commands from the Navigation module 220 and translates them into steering and power commands for the motors and steering apparatus. The Propulsion module 214 utilizes a CAN bus to convey signals from the navigation module to the propulsion module. These signals conform to ANSI's ISO 11898-Road Vehicles Controller Area Network—to control the throttle, braking system, and steering control subsystems on the herding vehicle.

The Propulsion module 214 accepts as inputs vector information from the Navigation module 220 and translates it into commands for vehicle motion necessary to place it on the first vector until it is within 25 feet of the Stray 104 and then to position it on the extension of vector one, reducing its speed as it begins to drive the Stray 104 back into the Herd 102. The Propulsion Module expresses the commands in the form of steering, speed, and braking values for the CAN bus.

The Suspension module is a suspension system appropriate for the vehicle. A suspension system is the mechanisms on a ground-based vehicle that connect elements such as a plurality of wheels with tires or tracks to the body of the vehicle, typically comprising springs, shock absorbers, and steering linkages. On an aerial vehicle, the suspension system comprises the lifting means such as wings and a plurality of rotors, and the mechanisms for altering the amount of lift such means generate, and the direction in which it is exerted. It calculates appropriate lift vectors and translates them into commands for rotor RPM and pitch.

The Suspension module 216 and Propulsion module 214 are built into commercially available vehicles, whether they be designed for operation across the ground or for operation through the air.

The Alerting module contains a loudspeaker and a mechanism such as a pole for waving a flag or generating other prominent movements and audio algorithms and data for generating sounds, including simulated human voice sounds. The Alerting module 208, upon receiving a signal from the Navigation module 220, generates rapid movements and loud sounds from its loudspeaker such as replicas of human cowboys shouting "ha-yah!" and animals mooing to encourage the Stray 104 to return to the Herd 102. The Alerting module 208 receives its activation signal from the Navigation module 220 when the Herding vehicle 106 is within the Flight Zone 502 of the Stray 104.

The Remote control device 112 translates human operating control movements into commands to the Herding vehicle 106, which are transmitted via the RF Control link 204 to the Herding vehicle 106 causing it to begin or a terminate an autonomous mission.

The main alternative embodiment uses an autonomous commercially available unmanned aerial vehicle of the rotorcraft type as the Herding vehicle 106. A rotorcraft is an aerial vehicle in which lift and thrust are provided by means of one or more rotors rather than by wings and separate thrust devices. All of the modules on the aerial vehicle in this embodiment work similarly to their counterparts on the ground vehicle embodiment, except that the vectors are three-dimensional, enabling the Herding vehicle 106 to use altitude as well as latitude and longitude to trigger the desired movement of the Stray 104.

I claim:
1. A system for detecting stray animals and driving them back into a herd, comprising:
   an autonomous herding vehicle configured to identify a herd of animals and a stray;
   a global navigation system;
   the autonomous herding vehicle comprising:
   a sensor module;
   a computer, comprising:
   an animal detection module, which uses image templates derived from machine learning;
   a location module;
   a herding module, which uses models of animal flight behavior to calculate:
   a circle representing a stray's flight zone, wherein the radius of said circle being equal to a distance from the stray such that the autonomous herding vehicle moving closer to the animal than that distance will cause the stray to move away from the autonomous herding vehicle;
   a stray's point of balance, wherein the stray's point of balance is a point such that:
   when the autonomous herding vehicle moves to a location to position the head of the stray between the autonomous herding vehicle and the stray's point of balance will cause the stray to move backwards, and when the autonomous herding vehicle moves to a location to position the tail of the stray between the autonomous herding vehicle and the stray's point of balance will cause the stray to move forward;

a navigation module comprising:
a program that computes:
a first vector representing a course the herding vehicle must follow to close on the stray;
a second vector representing a path the stray must follow to return to the herd; and
a third vector connecting said animal flight zone and animal point of balance to the herding vehicle;
a fourth vector representing a the autonomous herding vehicle must follow to position the vehicle within the stray's flight zone and forward or back of its point of balance to cause the stray to return to the herd;
and a communications module;
a propulsion module;
a suspension module;
an alerting module;
a data bus connecting the modules; and
a commercially available remote control device, delivered with the vehicle, capable of transmitting and receiving radio signals comprising commands to the vehicle;
generating movement of the autonomous herding vehicle to follow said fourth vector.

2. The system of claim 1, wherein the sensor module comprises:
A camera-LiDar fusion device;
a global navigation system radio receiver;
an inertial measurement unit; and
a control signal radio receiver.

3. The system of claim 1, wherein the animal detection module comprises:
a program that integrates the signals received from the sensor module to form a sensed image;
a machine-learning-derived repository of animal images for comparison with images obtained by the sensor module, wherein the repository is developed by applying algorithms learned from large learning databases of animal images; and
a program that compares the sensed image to animal images from the repository comprising the herd and sets a flag when it recognizes the sensed image as representing such an animal.

4. The system of claim 1, wherein the location module comprises:
a program that calculates the position of the herding vehicle on which it is installed;
a program that calculates the position of the herd;
a program that calculates the position of the stray with respect to the herd; and
a program that calculates the position of the herding vehicle with respect to the stray.

5. The system of claim 1, wherein the propulsion module comprises:
a commercially available unmanned aerial vehicle of the rotorcraft type, comprising:
a plurality of rotors and flight controls sufficient to cause the vehicle to leave the ground and hover and travel at up to 35 miles per hour through the air;
an on-board sensor module and navigation module necessary to control the vehicle; and
a radio link with a remote control module capable of sending control commands to the vehicle.

6. The system of claim 1, wherein the herding vehicle comprises:
a commercially available ground vehicle of the ATV type, comprising:
a plurality of wheels, axles, and steering mechanisms to cause the vehicle to travel at up to 35 miles per hour over the ground;
on-board sensors and navigation subsystems necessary to control the vehicle; and
a radio link to a remote control device.

7. The system of claim 1, wherein the herding vehicle comprises:
a commercially available unmanned aerial vehicle of the rotorcraft type.

8. The system of claim 5, wherein the alerting module comprises:
data links to the location, navigation, and herding modules;
a visual signaling device;
a loud speaker;
a computer; and
a computer program capable of generating one of
audio signals comprising:
a loud horn sound;
a replica of the sound of an animal in distress, derived from empirical animal data; and
a replica of the sound of a human cowboy shouting "Ha-yah! Ha-yah!", derived from empirical animal data; and
visual signals comprising flashes of light and rapid movements of physical signaling devices and of the herding vehicle causing the herding vehicle to fly rapidly left, right, forward and back within a circle having a diameter of about 6 feet; and
logic that causes the computer program to send an audio signal to the loud speaker with one of the horn sound, the sound of the animal in distress, and or the "Ha-yah! Ha-yah" sound and to send a visual signal to the visual signaling device when the computer program receives an activation signal from the navigation and location modules.

9. A method for herding stray animals back into a herd, comprising:
obtaining a herding vehicle;
locating the herding vehicle;
identifying a herd of animals;
identifying an animal that has strayed from the herd;
locating the herd;
locating the stray;
determining a path necessary for the herding vehicle to close on the stray;
determine a circle representing a stray's flight zone, wherein the radius of said circle being equal to a distance from the stray such that the herding vehicle moving closer to the animal than that distance will cause the stray to move away from the herding vehicle;
determine a stray's point of balance, wherein the stray's point of balance is a point such that: when the herding vehicle moves to a location to position the head of the stray between the herding vehicle and the stray's point of balance will cause the stray to move backwards, and when the herding vehicle moves to a location to position the tail of the stray between the herding vehicle and the stray's point of balance will cause the stray to move forward;
determining the movements of the herding vehicle necessary to position the vehicle within the stray's flight zone and forward or back of its point of balance to cause the stray to return to the herd; and generating a specific noise or movement derived from empirical animal data to induce the stray's motivation to return to the herd.

10. The method of claim 9, wherein locating the herding vehicle comprises the steps of:
   acquiring signals from a global navigation system; and
   determining the latitude and longitude of the herding vehicle.

11. The method of claim 9, wherein identifying a herd of animals comprises the steps of:
   selecting a type of animal;
   acquiring images from a camera and lidar fusion device;
   comparing those images to templates of selected animals derived by machine learning, wherein the templates are developed by applying algorithms learned from large learning databases of animal images; and
   computing distance and azimuth from herding vehicle to matching images.

12. The method of claim 9, wherein identifying an animal that has strayed from the herd comprises:
   identifying a single animal at a distance of more than 50 feet from the herd; and
   determining the location of the animal.

* * * * *